United States Patent
Kraemer

(10) Patent No.: US 12,415,303 B2
(45) Date of Patent: Sep. 16, 2025

(54) TWO-SIDED MOLD FOR MOLDING AIRCRAFT COMPONENTS AND METHOD OF USE

(71) Applicant: JETZERO, INC., Long Beach, CA (US)

(72) Inventor: Dirk Kraemer, Rhineland-Palatinate (DE)

(*) Notice: Subject to any disclaimer, the term of this patent is extended or adjusted under 35 U.S.C. 154(b) by 0 days.

(21) Appl. No.: 18/201,862

(22) Filed: May 25, 2023

(65) Prior Publication Data
US 2024/0391150 A1    Nov. 28, 2024

(51) Int. Cl.
| | |
|---|---|
| B29C 45/44 | (2006.01) |
| B29C 45/34 | (2006.01) |
| B29C 45/76 | (2006.01) |
| B64F 5/10 | (2017.01) |
| B29L 31/30 | (2006.01) |

(52) U.S. Cl.
CPC .......... B29C 45/4478 (2013.01); B29C 45/34 (2013.01); B29C 45/76 (2013.01); B64F 5/10 (2017.01); *B29L 2031/3076* (2013.01)

(58) Field of Classification Search
CPC ...... B29C 45/34; B29C 45/76; B29C 45/4478
See application file for complete search history.

(56) References Cited

U.S. PATENT DOCUMENTS

| | | | | |
|---|---|---|---|---|
| 2,714,226 A | * | 8/1955 | Axelrad | B29C 45/4478 425/DIG. 44 |
| 3,743,236 A | * | 7/1973 | Schwenk | B29C 45/4478 249/150 |
| 3,987,144 A | * | 10/1976 | Nickold | B29C 45/4407 264/318 |
| 4,531,704 A | * | 7/1985 | Matthei | B29C 45/44 249/67 |
| 4,863,330 A | * | 9/1989 | Olez | B29C 70/14 411/908 |
| 5,639,405 A | * | 6/1997 | Erikson | B29C 45/1732 264/572 |
| 5,639,416 A | | 6/1997 | Pennisi | |
| 5,651,932 A | * | 7/1997 | Butler | B29C 33/505 264/318 |
| 5,662,946 A | * | 9/1997 | Pratt | B29C 45/2673 425/577 |
| 5,667,191 A | * | 9/1997 | Nemoto | B28B 7/34 164/369 |
| 5,783,133 A | * | 7/1998 | Hara | B29C 70/68 264/261 |
| 6,165,407 A | * | 12/2000 | Tahara | B29C 45/37 249/134 |
| 8,293,165 B2 | | 10/2012 | Kurihara | |
| 8,703,269 B2 | | 4/2014 | Reighley | |

(Continued)

*Primary Examiner* — Emmanuel S Luk
(74) *Attorney, Agent, or Firm* — Caldwell Intellectual Property Law

(57) ABSTRACT

A mold for molding aircraft components is provided. The mold includes a mold first part, a mold second part, and a mold insert, the mold first part and mold insert combining to form a cavity defining the shape of an aircraft component. The cavity may be filled with reinforcing fiber and then infused with matrix material to form a fiber-reinforced composite part. The mold may include one or more sensors to monitor data related to a molding process such as pressure, temperature, and material flow.

8 Claims, 7 Drawing Sheets

(56) References Cited

U.S. PATENT DOCUMENTS

| | | | |
|---|---|---|---|
| 9,317,626 B2* | 4/2016 | Chan | G06F 30/00 |
| 9,694,898 B2 | 7/2017 | Aitken | |
| 2002/0037389 A1* | 3/2002 | Miyano | B29C 45/4421 |
| | | | 264/318 |
| 2003/0122272 A1* | 7/2003 | Smith | B29C 45/77 |
| | | | 264/328.8 |
| 2004/0130072 A1* | 7/2004 | Sekido | B29C 70/48 |
| | | | 264/40.1 |
| 2004/0227393 A1* | 11/2004 | Meggiolan | B60B 21/12 |
| | | | 264/572 |
| 2010/0155981 A1* | 6/2010 | Miyabe | B29C 45/1676 |
| | | | 264/45.2 |
| 2012/0097323 A1* | 4/2012 | Nitsch | B29C 70/30 |
| | | | 156/212 |
| 2012/0242004 A1* | 9/2012 | Smith | B29C 45/4421 |
| | | | 425/577 |
| 2013/0099405 A1* | 4/2013 | Kraemer | B29C 70/48 |
| | | | 425/149 |
| 2013/0277886 A1* | 10/2013 | Fujiwara | B29C 45/44 |
| | | | 264/318 |
| 2013/0294901 A1* | 11/2013 | Mironets | B22D 27/04 |
| | | | 164/80 |
| 2014/0335219 A1* | 11/2014 | Altonen | B29C 45/73 |
| | | | 425/576 |
| 2016/0229102 A1* | 8/2016 | Galati | B29C 45/77 |
| 2017/0100894 A1* | 4/2017 | Burns | B29C 35/0288 |
| 2017/0129194 A1* | 5/2017 | Cinquin | B29C 70/54 |
| 2017/0284521 A1* | 10/2017 | Sorimoto | B29C 45/332 |
| 2018/0065286 A1* | 3/2018 | Pruitt | B29C 45/2673 |
| 2018/0370163 A1* | 12/2018 | Belisle | B29C 70/46 |
| 2019/0152169 A1* | 5/2019 | Volpato | B29C 70/548 |
| 2019/0193147 A1* | 6/2019 | Navarro Teixidó | B22D 21/007 |
| 2020/0180717 A1* | 6/2020 | Bigolin | B62J 1/18 |
| 2022/0080631 A1* | 3/2022 | Suzuki | B29C 44/5627 |
| 2022/0194028 A1* | 6/2022 | Schubert | B29C 33/405 |
| 2023/0272957 A1* | 8/2023 | Mattson, Jr. | F25C 1/20 |
| | | | 62/342 |

* cited by examiner

TWO-SIDED MOLD FOR MOLDING AIRCRAFT COMPONENTS AND METHOD OF USE

FIELD OF THE INVENTION

The present invention generally relates to the field of composite molding. In particular, the present invention is directed to two-sided molds for molding aircraft components and methods for using them.

BACKGROUND

Traditional molding techniques utilized in the aircraft industry typically rely on a single-sided mold with a layup portion and a vacuum sealed bag. Present molds and techniques have the drawback that certain components may not be properly supported during the molding process.

SUMMARY OF THE DISCLOSURE

In an aspect a two-sided mold for molding a portion of an aircraft, the mold comprising: a mold first part and a mold second part, wherein the mold first part and the mold second part form a mold cavity defining an aircraft component; and at least one sensor disposed at least partially within at least one of the mold first part and the mold second part, the sensor containing detection circuitry configured to detect one or more of pressure, temperature, and material flow.

In another aspect a method of molding a portion of an aircraft in a two-sided mold, is disclosed, the method comprising providing a mold first part and a mold second part, wherein the mold first part and the mold second part form a mold cavity defining an aircraft component; receiving, from at least one sensor containing detection circuitry configured to detect one or more of pressure, temperature, and material flow and disposed at least partially within at least one of the mold first part and the mold second part, sensor data related to a molding process; and flowing a matrix material into the mold cavity based on the sensor data These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for molding an aircraft utilizing a two-sided mold. The two-sided mold has a mold first part and a mold second part and at least one sensor disposed in the mold to measure parameters during a molding process. The mold allows for the molding of aircraft components such as a pressure vessel for an aircraft, including but not limited to a blended wing body aircraft, which is an aircraft whose wings and body have no clear demarcation.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 3. Furthermore, there is no intention to be bound by any expressed or implied theory presented in this disclosure.

Figure 1:
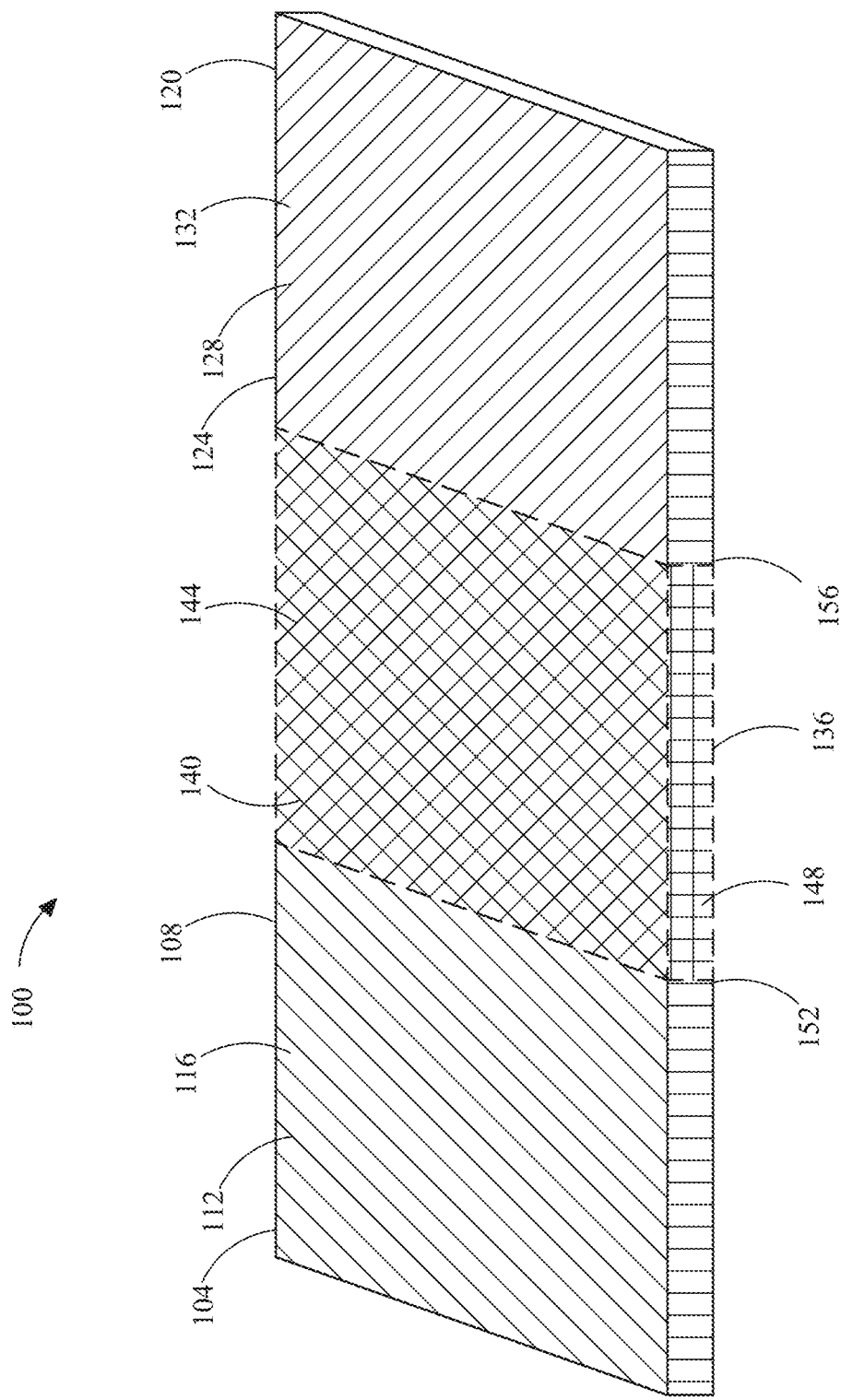
FIG. 1 is an isometric view of an exemplary embodiment of a composite assembly according to the subject disclosure.

Referring to FIG. 1, a composite assembly 100 for a blended wing body aircraft is illustrated. Composite assembly 100 includes a first assembly 104. First assembly 104 includes a first molded part 108, wherein first molded part 108 contains a first plurality of fibers 112 and is partially infused with a first resin 116. An "assembly" as described in this disclosure is a plurality of individual components that may be joined together to create a finished individual product. "Composite" as defined in this disclosure is material which is produced from two or more materials. Composites may include a plurality of carbon fiber strands that are permeated with a plastic resin. "Composite assembly" as defined in this disclosure is a plurality of composites or components that may be joined together to create a single product. For example, composite assembly 100 may include a plurality of composites wherein each composite is joined together to create a single product. In some embodiments, composite assembly 100 may refer to a composite laminate. "Composite laminate" as defined herein is a composite having multiple layers or laminae, wherein each lamina is a thin layer of a material or a composite material. First molded part 108 may include a molded part. "Molded part" as described in this disclosure refers to a component that was created through a molding process in which a resin was poured into a mold. In some embodiments, first molded part 108 may be cured such that resin is hardened creating a solid pliable or non-pliable material. In some embodiments, first molded part 108 may include an uncured part wherein molded part is not yet cured and is still in a liquid form. First molded part 108 includes a plurality of fibers that is partially infused with first resin 116. First plurality of fibers 112 may include plurality of fibers mentioned below. Plurality of fibers may include a plurality of fiber strands wherein the fibers are spooled into fiber strands. Plurality of fibers may include a carbon fiber material wherein the fibers are strands of carbon fiber. Plurality of fibers may further include other fibers used for reinforcement of a composite. For example, plurality of fibers may include glass fibers, aramid fibers or basalt fibers. Plurality of fibers may be placed in a parallel direction wherein the fibers are all facing in one direction and are substantially parallel to each other. In some embodiments, plurality of fibers may be placed in a perpendicular direction wherein the fibers interlaced at a 90-degree angle. First resin 116 includes a resin as described in this disclosure. "Resin" as described in this disclosure is a compound consisting of a non-crystalline or viscous liquid substance. Resin may be reacted with a curing agent or a hardener in order to create a solid material. In some embodiments, resin may include vinylester resins, epoxy resins or any other lightweight resins with durability suitable for aircraft.

With continued reference to FIG. 1, first molded part 108 is partially infused with resin. "Infused" as defined herein refers to the process in which a resin is poured into or onto a dry laminate in order to create a composite. For example, resin may be poured into or on top of first plurality of fibers 112 such that first plurality of fibers 112 is embedded within resin. "Partially infused" as described herein refers to the process wherein only a portion or a section of plurality of fibers is embedded or wetted by resin. The remaining area of plurality of fibers remains dry or uninfused. First molded part 108 may be cured wherein first molded part 108 is a solid material. In some embodiments, infusion of first molded part 108 may be uncured wherein first molded part 108 is a liquid that can continue to be molded and cured at a later time. In some embodiments, first assembly 104 may contain a first uninfused region located an edge of first assembly 152. "Uninfused region" as described in this disclosure refers to a portion of first assembly 104 wherein first plurality of fibers 112 is not infused with first resin 116. In some embodiments, uninfused region may refer to an end of first plurality of fibers 112 wherein the end is not infused with first resin 116. In some embodiments first uninfused region may include portion of first plurality of fibers 140. First uninfused region may be located at an edge of first assembly 152 such as a corner, along a vertical edge or along a horizontal edge of first assembly 152.

With continued reference to FIG. 1, With continued reference to FIG. 1, first molded part 108 may be partially infused with resin using a vacuum infusion process or any other molding process as described in this disclosure.

With continued reference to FIG. 1, composite assembly 100 further includes a second assembly 120 relative to the first assembly 104, second assembly 120 including a second molded part 124. Second molded part 124 comprises a second plurality of fibers 128 and is partially infused with a second resin 132. Second molded part 124 includes a molded part as described above. In some embodiments, second molded part 124 is substantially similar to first molded part 108. In some embodiments, second molded part 124 is different from first molded part 108 wherein second molded part 124 may take a different shape or size. Additionally, or alternatively, second plurality of fibers 128 includes the plurality of fibers as mentioned above. Second plurality of fibers 128 may be substantially similar to first plurality of fibers 112 wherein second plurality of fibers 128 contain a similar material or a similar orientation as first plurality of fibers 112. in some embodiments, second plurality of fibers 128 may contain a different material or orientation as first plurality of fibers 112. For example, second plurality of fibers 128 may contain a carbon fiber material wherein the fibers are orientated at a 45-degree angle and first plurality of fibers 112 contains a glass fiber material oriented at a negative 45-degree angle. Additionally, or alternatively, second resin 132 may contain a resin as described in this disclosure. In some embodiments second resin 132 is substantially similar to first resin 116. For example, second resin 132 may contain a resin such as an epoxy resin or a resin similar to that of first resin 116. In some embodiments, second resin 132 may contain a resin that is different from first resin 116. In some embodiments, second assembly 120 may contain a second uninfused region. Second uninfused region may be located in an area to similar to that of first uninfused region. In some embodiments, second uninfused region may be located at an edge 156 that may compliment first uninfused region. For example, second uninfused region may be located on a left side of second assembly 120 and first uninfused region may be located on a right side of first assembly 104 wherein first uninfused region and second uninfused region meet and can be joined at an edge. In some embodiments second uninfused region may contain portion of second plurality of fibers 144. In some embodiments, first uninfused region and second uninfused region may contain a coating, the coating configured to prevent infusion of a resin. "Coating" as described herein may refer to a coating of a portion of plurality of fibers or a covering of the portion of plurality of fibers. Coating may include a coating such as polyvinyl alcohol or denatured alcohol. Coating may further include covering first uninfused region and covering second uninfused region such that first resin 116 or second resin 132 does not come into contact with the portions.

With continued reference to FIG. 1, second assembly 120 may be oriented relative to first assembly 104 such that second assembly 120 may be adjacent to first assembly 104. In some embodiments, second assembly 120 is stacked upon first assembly 104 wherein a surface of second assembly 120 may be substantially adjacent to a surface of first assembly 104. In some embodiments, second assembly 120 may be oriented relative to first assembly 104 wherein an edge of second assembly 156 is substantially adjacent to an edge of first assembly 152.

With continued reference to FIG. 1, first uninfused region may be overlayed by second uninfused region and infused a third resin 148. First uninfused region may be overlayed such that first uninfused region is substantially adjacent to or touching second uninfused region. In some embodiments first uninfused region includes at least a portion of first plurality of fibers 140. Similarly, in some embodiments, second uninfused region includes at least a portion of second plurality of fibers 144. First uninfused region may be overlayed wherein first uninfused region rests atop second uninfused region. In some embodiments, first uninfused region may be overlayed such that first uninfused region substantially covers second uninfused region. In some embodiments, first uninfused region may be overlayed such that first uninfused region is woven with second uninfused region. In some embodiments, first uninfused region may contain a plurality of layers and second uninfused region may contain a plurality of layers, wherein each layer of first uninfused region is overlayed each layer of second uninfused region. In some embodiments, first uninfused region and second uninfused region may be stitched together. "Third resin" as described herein refers to a resin as described above. In some embodiments, third resin 148 may be a cured resin wherein third resin 148 is a solid material binding the at least a portion of first plurality of fibers 140 and at least a portion of second plurality of fibers 144. In some embodiments, third resin 148 may be an uncured resin wherein at least a portion of first plurality of fibers 140 and at least a portion of second plurality of fibers 144 are embedded into to a wet matrix With continued reference to FIG. 1, composite assembly 100 includes a joining region 136. Joining region 136 comprises at least a portion of first plurality of fibers 140 and at least a portion of second plurality of fibers 144. At least a portion of first plurality of fibers 140 and at least a portion of second plurality of fibers 144 are substantially adjacent and infused with the third resin 148. "Joining region 136" as defined in this disclosure is a section of composite assembly 100 wherein two or more components are joined. For example, joining region 136 may include a portion of first assembly 104 and a portion of second assembly 120. "At least a portion of first plurality of fibers 140" as described herein refers to a segment of first plurality of fibers 112 from a first end extending towards a second end. Portion may include a segment that is less than half of the total length of first plurality of fibers 112. Portion may also include a segment that is more than half the length of first plurality of fibers 112. At least a portion of first plurality of fibers 140 may further include first uninfused region as described above. Similarly, "At least a portion of second plurality of fibers" as described herein refers to a segment of the second plurality of fibers 128 from a first end extending towards a second end. Portion may include a portion that is less than half of the total length of the second plurality of fibers 128. Portion may also include a segment that is more than half the length of the second plurality of fibers 128. At least a portion of second plurality of fibers 144 may further include second uninfused region as described above. "Substantially adjacent" as defined herein is substantially next to or adjoined. At least a portion of first plurality of fibers 140 and at least a portion of second plurality of fibers 144 are substantially adjacent and infused with third resin 148 such that the fibers are embedded in a single resin matrix. "Matrix" as described in this disclosure is a constituent of a composite material that binds fibers and provides the composite a shape. In some embodiments, at least a portion of first plurality of fibers 140 and at least a portion of second plurality of fibers 144 may be interwoven. In some embodiments, at least a portion of first plurality of fibers 140 and at least a portion of second plurality of fibers 144 may be facing in a parallel direction. In some embodiments, at least a portion of first plurality of fibers 140 and at least a portion of second plurality of fibers 144 may be facing in a perpendicular direction. In some embodiments, at least a portion of first plurality of fibers 140 and at least a portion of second plurality of fibers 144 may be bound using stitching, an adhesive or through tying the fibers together. In some embodiments, at least a portion of first plurality of fibers 140 and at least a portion of second plurality of fibers 144 may be stitched together.

With continued reference to FIG. 1, joining region 136 may include a plurality of first layers. First assembly 104 includes plurality of first layers. "Plurality of first layers" as described herein refers to a plurality of components attached or stacked upon each other to create a single unified product. Plurality of first layers may include a composite laminate wherein each individual layer refers to a lamina of the composite laminate. Plurality of first layers may include a plurality of lamina wherein in each lamina contains substantially similar material properties. For example, plurality of first layers may include a plurality of lamina wherein each lamina is a composite having carbon fiber embedded within a resin matrix. In some embodiments, plurality of first layers contains multiple laminae where in each lamina includes first plurality of fibers 112 and first resin 116. In some embodiments, plurality of first layers may be oriented in the same direction such that first plurality of fibers 112 in a first lamina are oriented in a similar direction than first plurality of fibers 112 in a second lamina. A benefit to orienting lamina in a similar direction may be to increase structural strength of first assembly 104 in one specific direction. In some embodiments, plurality of first layers may be oriented in the different direction such that first plurality of fibers 112 in a first lamina are oriented in a different direction than first plurality of fibers 112 in a second lamina. For example, plurality of first layers may contain one lamina oriented at a 45-degree angle and another oriented at a 30-degree angle. A benefit to orienting plurality of first layers in multiple directions is to increase distribute structural strength over multiple direction of first assembly 104. In some embodiments, individual layers, or lamina of first plurality of first layers may be overlapped with individual layers or lamina of plurality of second layers. For example, a first layer of first assembly 104 may be oriented above a first layer of second assembly 120, then a second layer of first assembly 104 may be oriented above a second layer of second assembly 120 and the like. In some embodiments, the plurality of first layers me be overlapped in another sequence such as a first and second layer of first assembly 104 overlapped over a first and second layer of second assembly 120.

With continued reference to FIG. 1, overlap as used in this disclosure may include interleaving. Interleaving may include placing additional composites, resins, carbon finer materials and the like at joining region 136. Overlap may further include placing first assembly 104 on top of second assembly 120 resulting in a single interface between first assembly 104 and second assembly 120. Overlap may further include placing first assembly 104 on top of second assembly 120 wherein an entirety of first assembly 104 is stacked on top of second assembly 120. Overlap may further include overlapping a plurality of assemblies wherein an entirety of at least one of the plurality of assemblies, is placed above an entirety of at least another assembly. Overlapping may further include any overlapping in which a portion of first assembly 104 is above or substantially adjacent to a portion of second assembly 120. Overlaps may be by the entire layup from one assembly onto another resulting in a single interface between the assemblies. Alternatively or additionally, overlaps may be by individual plies, or a variable number of plies. For example, in some cases, a non-woven composite material that is comprised of four layers of unidirectional material may be treated treated as a unit, which may be referred to as a "stack." In some cases, a joint may include interleaved muli-ply stacks, where each multi-ply stack is unseparated. Alternatively or additionally, a joint may include interleaved individual plies, where each stack is separated in the joint.

With continued reference to FIG. 1, in some embodiments, composite assembly 100 may include a portion of an outer mold line of an aircraft. In some embodiments, aircraft may include a blended wing body aircraft. "Outer mold line" as described herein refers to an outer surface of a shell of an aircraft. Outer mold line may include an outer surface of a wing of an aircraft, an outer surface of a fuselage of an aircraft and any other outer surface as described in this disclosure. Composite assembly 100 may include a portion of outer mold line. A portion here may include a piece of a section of the outer surface such as only a main body, only a fuselage or only an undercarriage of an aircraft. In some embodiments, a portion of outer mold line may further include areas that require increase structural strength or areas that require decreased structural strength. A portion of outer mold line may further include areas in which a pliable material may be used. Additionally, or alternatively, a portion of outer mold line may include areas in which a non-pliable material may be needed. In some embodiments, composite assembly 100 may include an outer mold line surface of aircraft. In some embodiments, composite assembly 100 may include an outer mold line surface of aircraft wherein composite assembly 100 is a single unified and cured composite.

Figure 2:
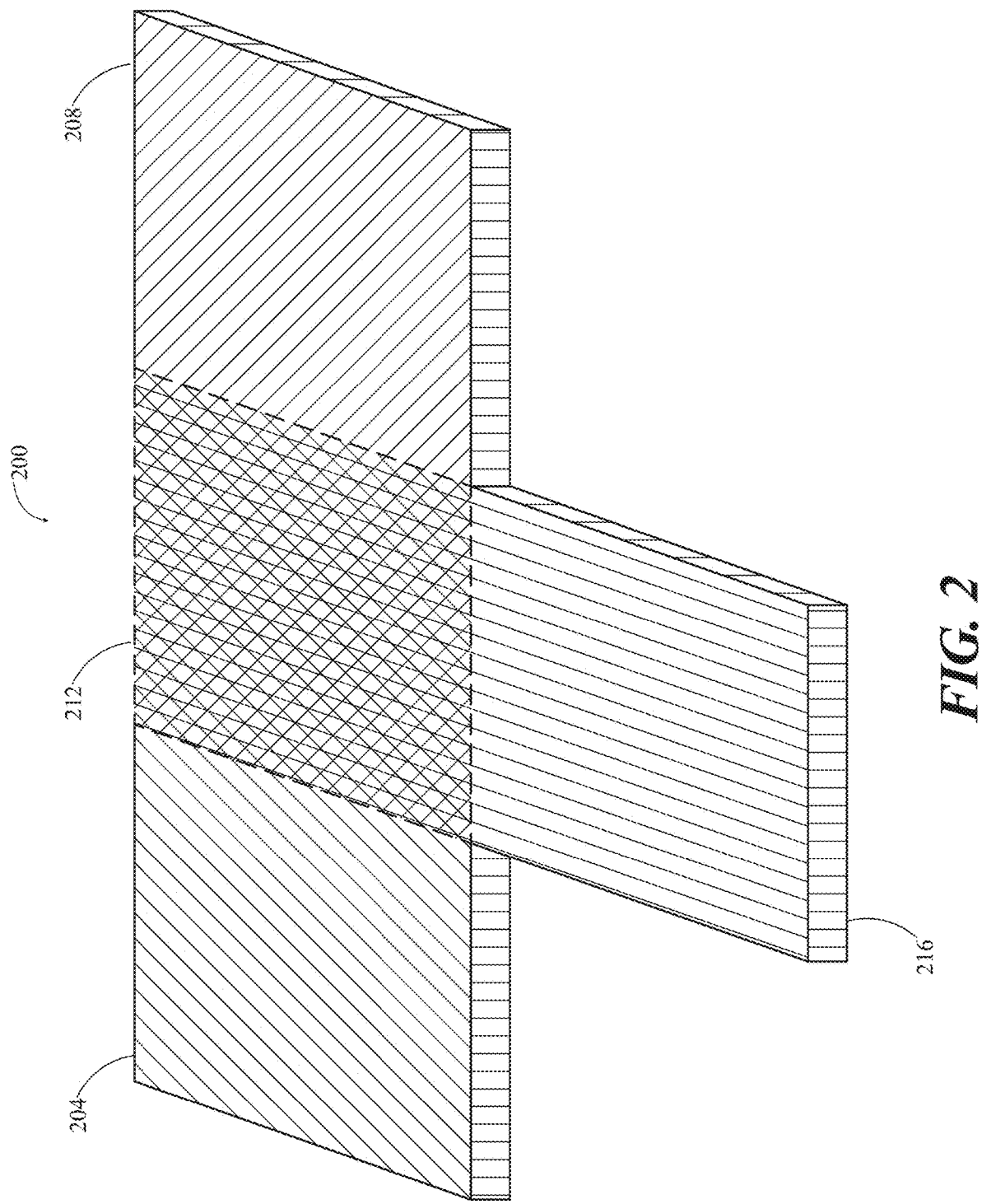
FIG. 2 is an isometric view of another exemplary embodiment of the composite assembly according to the subject disclosure.

Referring now to FIG. 2, an isometric view of another embodiment of a composite assembly 200 is illustrated. Composite assembly 200 includes a first assembly 204 as described in this disclosure. Composite assembly also includes a second assembly 208, and a joining region 212 as described in this disclosure. Joining region 212 may include a plurality of third layers. Plurality of third layers may belong to a third assembly 216 wherein the third assembly 216 contains similar properties to first assembly 204 and second assembly 208. Third assembly may include a molded part, a plurality of fibers, and a resin as described above. A plurality of first layers, a plurality of second layers and plurality of third layers may be overlapped similar to any overlapping as described in this disclosure. In some embodiments, individual layers of plurality of third layers is overlapped by the individual layers of the plurality of first layers and the individual layers of the plurality of third layers. In some embodiments, third assembly 216 is a structural element having out of plane depth wherein third assembly 216 is attached to first assembly 204 and second assembly 208 and cured.

With continued reference to FIG. 2, in some embodiments, joining region 212 may include more than two assemblies wherein at least one of the more than two assemblies contains a plurality of layers and wherein the more than two assemblies are overlapped with one another. Plurality of layers may be similar to plurality of first layers as described above. As a non-limiting example, joining region 212 may contain first assembly 204, second assembly 208, third assembly 216 and a fourth assembly. Continuing the example, first assembly 204 may contain plurality of first layers, second assembly 208 may contain plurality of second layers, third assembly 216 may contain plurality of third layers and fourth assembly may contain a plurality of fourth layers wherein plurality of fourth layers may be similar to plurality of first layers. More than two assembles may be overlapped as described above. It is to be understood that joining region 212 may contain a plurality of assemblies, wherein each assembly contains a plurality of layers and wherein plurality of assemblies are overlapped.

Figure 3:
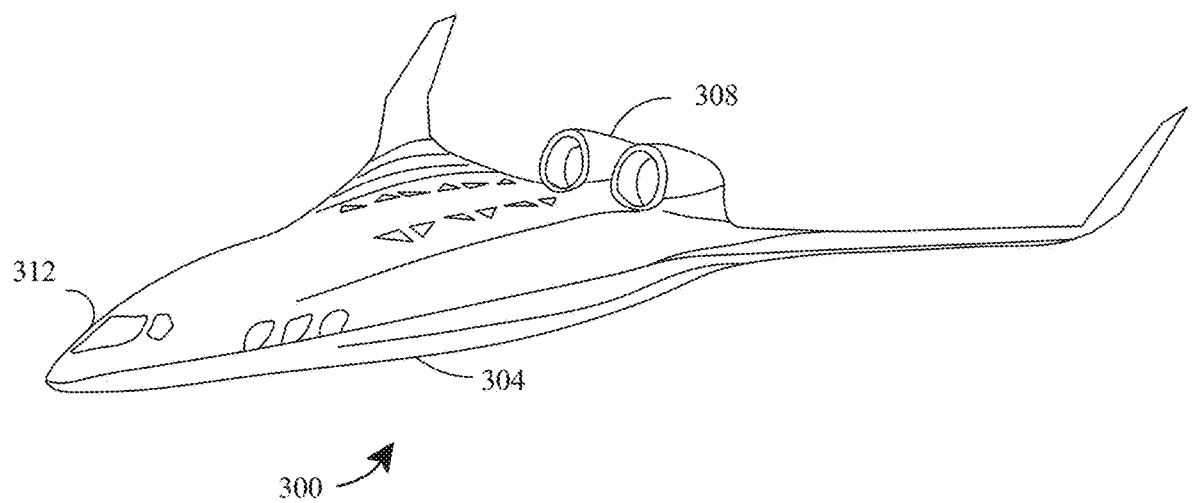
FIG. 3 is a schematic of an exemplary blended wing aircraft.

Referring to FIG. 3, an exemplary blended wing aircraft 300 is illustrated. Aircraft 300 may include a blended wing body 304. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 304 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 304 design may or may not be tailless. One potential advantage of a BWB 304 may be to reduce wetted area and any accompanying drag associated with a conventional wing-body junction. In some cases, a BWB 304 may also have a wide airfoil-shaped body, allowing entire aircraft to generate lift and thereby facilitate reduction in size and/or drag of wings. In some cases, a BWB 304 may be understood as a hybrid shape that resembles a flying wing, but also incorporates features from conventional aircraft. In some cases, this combination may offer several advantages over conventional tube-and-wing airframes. In some cases, a BWB airframe 304 may help to increase fuel economy and create larger payload (cargo or passenger) volumes within the BWB. BWB 304 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

Still referring to to FIG. 3, BWB 304 of aircraft 300 may include a nose portion. A "nose portion," for the purposes of this disclosure, refers to any portion of aircraft 300 forward of the aircraft's fuselage 316. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

Still referring to to FIG. 3, BWB 304 may include at least a structural component of aircraft 300. Structural components may provide physical stability during an entirety of an aircraft's 300 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 300 structure, they may be so named A, B, C, and so on named from nose to tail. Pillars, like any structural element, may be disposed a distance away from each other, along an exterior of aircraft 300 and BWB 304. Depending on manufacturing method of BWB 304, pillars may be integral to frame and skin, comprised entirely of internal framing, or alternatively, may be only integral to structural skin elements. Structural skin will be discussed in greater detail below.

Still referring to to FIG. 3, BWB 304 may include a plurality of materials, alone or in combination, in its construction. At least a BWB 304, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 304 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 304 may additionally or alternatively use wood or another suitably strong yet light material for an internal structure.

Still referring to to FIG. 3, aircraft 300 may include monocoque or semi-monocoque construction. BWB 304 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 3000° C. A person of skill in the art will further appreciate that aerospace applications may require high-strength, low-weight, high heat resistance materials in a plurality of roles, such as without limitation fuselages, fairings, control surfaces, and structures, among others.

Still referring to to FIG. 3, BWB 304 may include at least a fuselage. A "fuselage," for the purposes of this disclosure, refers to a main body of an aircraft 300, or in other words, an entirety of the aircraft 300 except for nose, wings, empennage, nacelles, and control surfaces. In some cases, fuselage may contain an aircraft's payload. At least a fuselage may comprise structural components that physically support a shape and structure of an aircraft 300. Structural components may take a plurality of forms, alone or in combination with other types. Structural components vary depending on construction type of aircraft 300 and specifically, fuselage. A fuselage 313 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

Still referring to to FIG. 3, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 300. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 300 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

Still referring to to FIG. 3, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

Still referring to to FIG. 3, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

Still referring to to FIG. 3, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

Still referring to to FIG. 3, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

Still referring to to FIG. 3, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 304. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^3$) or Pascals (Pa). In semi-monocoque construction stressed skin bears part of aerodynamic loads and additionally imparts force on an underlying structure of stringers and formers.

Still referring to to FIG. 3, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 300 is in its level flight orientation or sitting on ground. A post may act similarly to stringer in that it is configured to support axial loads in compression due to a load being applied parallel to its axis due to, for example, a heavy object being placed on a floor of aircraft 300. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

Still referring to to FIG. 3, aircraft 300 may include at least a flight component 308. A flight component 308 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 300 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 300. In some embodiments, at least a flight component 308 may include a propulsor, for example a rotor attached to an electric motor configured to produce shaft torque and in turn, create thrust. As used in this disclosure, an "electric motor" is an electrical machine that converts electric energy into mechanical work.

Still referring to to FIG. 3, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

Still referring to to FIG. 3, at least a flight component may be one or more devices configured to affect aircraft's 300 attitude. "Attitude", for the purposes of this disclosure, is the relative orientation of a body, in this case aircraft 300, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 300. A plurality of attitude datums may indicate one or more measurements relative to an aircraft's pitch, roll, yaw, or throttle compared to a relative starting point. One or more sensors may measure or detect an aircraft's 300 attitude and establish one or more attitude datums. An "attitude datum", for the purposes of this disclosure, refers to at least an element of data identifying an attitude of an aircraft 300.

Still referring to to FIG. 3, in some cases, aircraft 300 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

Still referring to FIG. 3, in some cases, aircraft 300 may include at least a pilot control. As used in this disclosure, a "pilot control," is an interface device that allows an operator, human or machine, to control a flight component of an aircraft. Pilot control may be communicatively connected to any other component presented in aircraft 300, the communicative connection may include redundant connections configured to safeguard against single-point failure. In some cases, a plurality of attitude datums may indicate a pilot's instruction to change heading and/or trim of an aircraft 300. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 300. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 308 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

Still referring to to FIG. 3, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 308. At least a flight component 308 may include any propulsor as described herein. In embodiment, at least a flight component 308 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

Still referring to to FIG. 3, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

Still referring to to FIG. 3, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Still referring to to FIG. 3, at least a flight component 308 may include wings, empennages, nacelles, control surfaces, fuselages, and landing gear, among others, to name a few. In embodiments, an empennage may be disposed at the aftmost point of an aircraft body 304. Empennage may comprise a tail of aircraft 300, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 300 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 300 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 304 aircraft 300 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 308 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 308 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 300. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 300 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

Still referring to to FIG. 3, aircraft 300 may include an energy source. Energy source may include any device providing energy to at least a flight component 308, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

Still referring to to FIG. 3, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 304 of aircraft 300, for example without limitation within a wing portion 313 of blended wing body 308. Aviation fuels may include petroleum-based fuels, or petroleum and synthetic fuel blends, used to power aircraft 300. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 300. Liquid fuel may include Jet-A. Presently Jet-A powers modern commercial airliners and is a mix of extremely refined kerosene and burns at temperatures at or above 49° C. (130° F.). Kerosene-based fuel has a much higher flash point than gasoline-based fuel, meaning that it requires significantly higher temperature to ignite.

Still referring to to FIG. 3, modular aircraft 300 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

Still referring to to FIG. 3, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 3 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

Still referring to to FIG. 3, aircraft 300 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

Still referring to to FIG. 3, aircraft 300 may include multiple flight component 308 sub-systems, each of which may have a separate energy source. For instance, and without limitation, one or more flight components 308 may have a dedicated energy source. Alternatively, or additionally, a plurality of energy sources may each provide power to two or more flight components 308, such as, without limitation, a "fore" energy source providing power to flight components located toward a front of an aircraft 300, while an "aft" energy source provides power to flight components located toward a rear of the aircraft 300. As a further non-limiting example, a flight component of group of flight components may be powered by a plurality of energy sources. For example, and without limitation, two or more energy sources may power one or more flight components; two energy sources may include, without limitation, at least a second energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 308. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

Still referring to to FIG. 3, aircraft 300 may include a flight component 308 that includes at least a nacelle 308. For the purposes of this disclosure, a "nacelle" is a streamlined body housing, which is sized according to that which is houses, such as without limitation an engine, a fuel store, or a flight component. When attached by a pylon entirely outside an airframe 304 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 300 partially or wholly enveloped by an outer mold line of the aircraft 300. At least a nacelle may be designed to be streamlined. At least a nacelle may be asymmetrical about a plane comprising the longitudinal axis of the engine and the yaw axis of modular aircraft 300.

Still referring to FIG. 3, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a second body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

Still referring to to FIG. 3, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

Still referring to to FIG. 3, in nonlimiting embodiments, at least a flight component 308 may include an airbreathing engine such as a jet engine, turbojet engine, turboshaft engine, ramjet engine, scramjet engine, hybrid propulsion system, turbofan engine, or the like. At least a flight component 308 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may includes heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

Still referring to to FIG. 3, an aircraft 300 may include a flight controller. As used in this disclosure, a "flight controller" is a device that generates signals for controlling at least a flight component 308 of an aircraft 300. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

Still referring to to FIG. 3, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a second location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 300 and/or computing device.

Still referring to FIG. 3, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
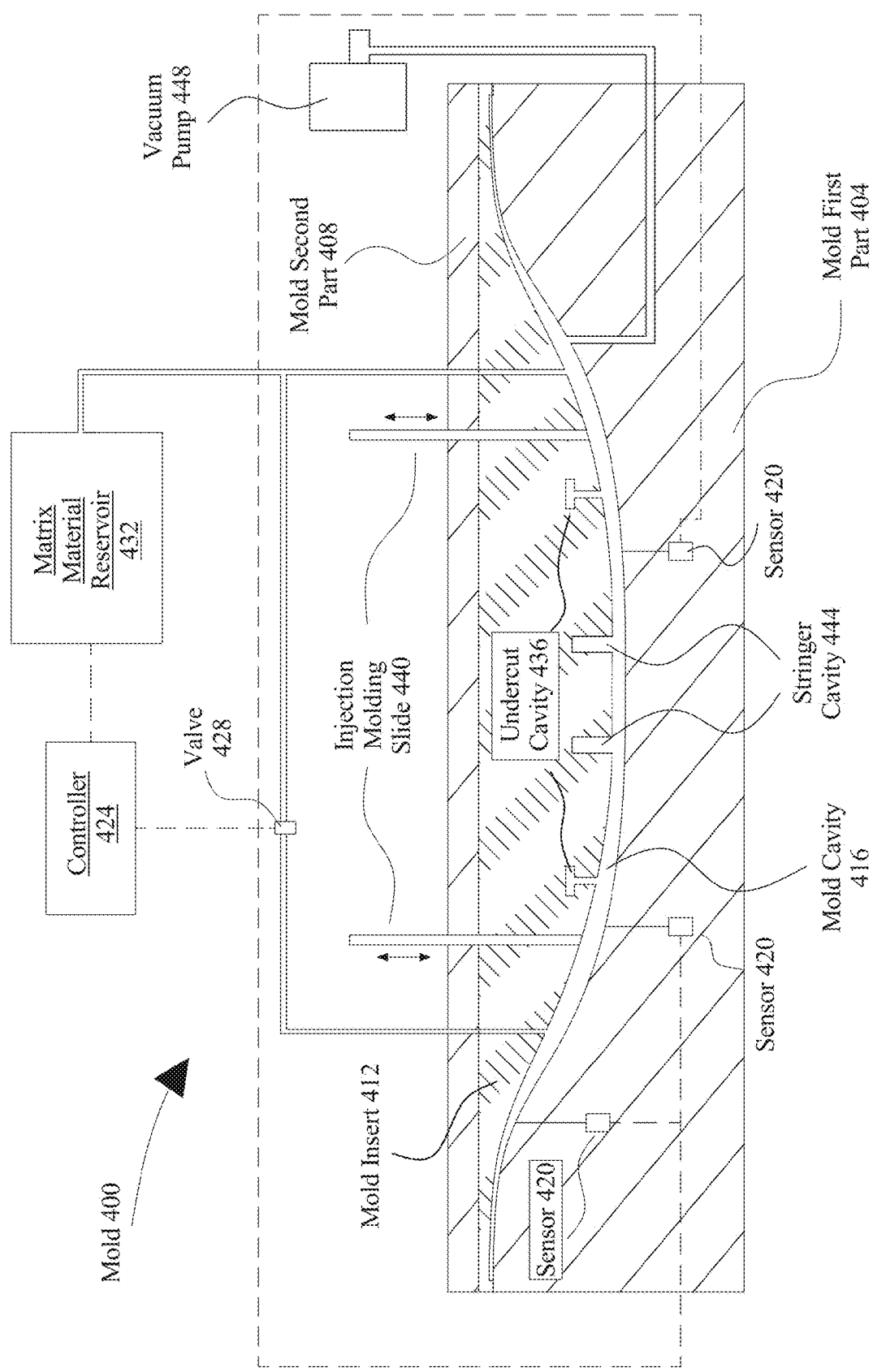
FIG. 4 is a representative illustration of a mold in accordance with the disclosure.

Now referring to FIG. 4, a mold 400 for molding an aircraft body is described. Mold 400 includes mold first part 404, mold second part 408, and mold insert 412. Mold first part 404 and mold second part 408 include at least one molding insert. A "mold insert," as used herein, is defined as an interchangeable portion of the mold which is in contact with a part during a molding process. A mold insert 412 may support a molded part and apply a force on the molded part (or elements of the molded part such as a reinforcing fiber and/or matrix material) during a molding process. A "matrix material," as used herein, is defined as a material that binds and transfers force to and from reinforcing elements in a composite. A mold insert 412 may have a texture. Mold insert 412 may impart the inverse of the texture onto a part being molded. A texture may include any suitable texture such as stippled, woven, speckled, dappled, studded, brindled, smooth, polished, grained, rough, bumpy, knobby, coarse, irregular, uneven, and the like. Mold first part 404, mold second part 408, and mold insert 412 are configured to be arranged such that a mold cavity 416 of a predetermined and defined shape is created. In an embodiment, mold cavity 416 defines an aircraft component or a shape of an aircraft component. In an embodiment, mold cavity 416 defines an aircraft pressure vessel. In an embodiment, mold cavity 416 defines an aircraft outer skin. In an embodiment, mold cavity 416 defines an aircraft wing. Mold cavity 416 may define any component or element of an aircraft such as aircraft 300 in FIG. 3, including a cockpit, a passenger compartment, a lavatory, a control surface, a storage compartment, a container (e.g. for mounting, storing, containing, receiving, or holding electrical components, mechanical components, sensors, computing devices, and the like), an opening (e.g. a window, a door, a receptacle for a fastener, etc.), an aircraft surface (such as an inner surface, a wall, etc.), a fuel tank, a battery compartment, and the like. Mold cavity 416 may define structural components of an aircraft body including one or more stringers, one or more formers, one or more ribs, one or more reinforcing plates, and the like.

With continued reference to FIG. 4, mold cavity 416 may be fluidically coupled with a vacuum pump 448. Vacuum pump 448 may be used to remove excess air, trapped air bubbles, or other types of voids from injected matrix material by reducing the pressure in the mold cavity 416. In an embodiment, vacuum pump 448 may be used to reduce the pressure needed to inject matrix material into mold cavity 416. Vacuum pump 448 may reduce pressure to less than about 0.75 atm, 0.5 atm, 0.25 atm, 0.1 atm, 0.01 atm, 0.001 atm, 0.0001 atm, or lower pressures. The vacuum pump may pull vacuum through the dry (i.e. not wetted with matrix material) reinforcing fiber. For example, some air in mold cavity 416 may travel through a dry cloth preform made of reinforcing fiber when vacuum pump 448 is activated. This may advantageously pull matrix material into a reinforcing fiber preform and additionally compress a deformable elastomer mold insert 412 and pull the mold insert 412 more tightly against the reinforcing fiber preform, reducing resin volume and weight. Vacuum pump 448 may be or include one or more of a rotary vane pump, screw pump, turbopump, regenerative pump, centrifugal pump, cryogenic pump, and the like. Vacuum pump 448 may include a plurality of pumps connected in fluidic series or parallel (for example, in series such that the output of a first pump is fed into the output of a second pump, or in parallel such that two pumps act on the same volume).

With continued reference to FIG. 4, mold insert 412 may be deformable and allow for the positioning or placement of a reinforcing fiber preform to be partially disposed within, around, or proximal to mold insert 412. For example, mold insert 412 may be intentionally deformed to allow for an enlarging of cavities such as undercut cavity 436, stringer cavity 444, or a similar cavity. This may allow for a preform to be progressively inserted into portions of the mold insert 412, for example as on a belt or other moving mechanism. Mold insert may be designed such that a predetermined amount of force or range of forces are required to deform or distort portions of mold cavity 412 such as cavities defined by mold insert 412. Mold insert 412 may form one or more convex or concave surfaces and may be substantially shaped by a surface of mold first part 404.

With continued reference to FIG. 4, mold insert 412 may be removably attached to one or both of mold first part 404 and/or mold second part 408. One or more mold inserts 412 may be exchanged or removed from mold 400 such that a different part can be molded. For example, a first mold insert may define a port wing of aircraft 300, while a second mold insert may define a starboard wing of aircraft 300. Instead of requiring two separate molds, a single mold 400 with mold first part 404 and mold second part 408 may be constructed, and the two mold cavities may each allow for rapid molding of each wing without the additional expense of two different molds. Further, mold insert 412 may be significantly cheaper to make and/or replace, which allows for beneficial cost reductions as well as rapid improvements to aircraft components. For example, if an aircraft component design needs to be altered, instead of requiring an entirely new, relatively expensive mold to be made, a new, much cheaper mold insert 412 can be made. In an embodiment, mold first part 404 may define an outer mold line surface. An "outer mold line surface," as used herein, is defined as an outer surface or exposed surface of a part. Plural mold inserts 412 may interface with the same mold first part 404 to create a series of parts that have similar overall functionalities, but specific design differences that may be tailored to or refined for a particular application. For example, a plurality of mold inserts may be refined over time such that mold first part 404 defines the same aircraft surface, but successive mold inserts change the underlying structure, for example to use less material, increase strength, and otherwise improve functionality or performance.

With continued reference to FIG. 4, mold 400 includes at least one sensor 420 disposed at least partially within at least one of the mold first part 404, mold second part 408, and mold insert 412. Sensor 420 may comprise a plurality of sensors. The at least one sensor 420 may include detection circuitry or another mechanism configured to detect one or more molding parameters. "Molding parameters" are defined herein as physical properties related to an operation of a mold or a process of molding. Examples of molding parameters include pressure, temperature, material flow, a presence or absence of a material, force, and the like. As used in this disclosure, a "sensor" is a device that is configured to detect a phenomenon and transmit information related to the detection of the phenomenon. For example, and without limitation, a sensor may transduce a detected phenomenon and/or characteristic, such as, and without limitation, temperature, voltage, current, pressure, and the like, into a sensed signal such as a voltage with respect to a reference. Sensor 420 may detect a plurality of data. A plurality of data detected by sensor 420 may include, but is not limited to battery capacity, current, voltage, pressure, temperature, moisture level, and the like. In one or more embodiments, and without limitation, sensor 420 may include a plurality of sensors. In one or more embodiments, and without limitation, sensor 420 may include an optical or image sensor such as a camera, a CMOS detector, a CCD detector, a video camera, a photodiode, a photovoltaic cell, a photoconductive device, a thermal and/or infrared camera, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 420 may be a contact or a non-contact sensor. Signals may include electrical, electromagnetic, visual, audio, radio waves, or another undisclosed signal type alone or in combination. Sensor 420 may include a humidity sensor. Humidity, as used in this disclosure, is the property of a gaseous medium to hold water in the form of vapor.

With continued reference to FIG. 4, sensor 420 may include electrical sensors. Electrical sensors may be configured to measure voltage across a component, electrical current through a component, and resistance of a component. In one or more embodiments, sensor 420 may include thermocouples, thermistors, thermometers, infrared sensors, resistance temperature detectors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 420, may be measured in Fahrenheit (° F.), Celsius (° C.), kelvin (K), Rankine (° R), or another scale alone or in combination. The temperature measured by sensors may comprise electrical signals, which are transmitted to their appropriate destination wireless or through a wired connection.

With continued reference to FIG. 4, sensor 420 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like. Sensor 420 may be configured to detect a plurality of data, as discussed further below in this disclosure. For example, sensor 420 may be configured to detect light or image data such as detecting a flow of matrix material through a transparent medium such as a vacuum bag or transparent mold part.

With continued reference to FIG. 4, sensor 420 may include a sensor suite which may include a plurality of sensors that may detect similar or unique phenomena. For example, in a non-limiting embodiment, a sensor suite may include a plurality of voltmeters or a mixture of voltmeters and thermocouples. Mold 400 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 4, sensor 420 may include a sense board. A sense board may have at least a portion of a circuit board that includes one or more sensors configured to measure or detect a sensor input. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 4, in some embodiments, at least a sensor 420 may include at least a camera. In some embodiments, a mold 400 may include a plurality of cameras. As used in this disclosure, a "camera" is a device that is configured to sense electromagnetic radiation, such as without limitation visible light, and generate an image representing the electromagnetic radiation. In some cases, the at least a camera may include one or more optics. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared. In some embodiments, the at least a camera may generate image data, where sensor data may include the image data as described below. As used in this disclosure, "image" is information representing at least a physical scene, space, and/or object. As a non-limiting example, the image data may include an image of a vehicle, a license plate, door, window, handle, and the like of the vehicle, a driver of the vehicle, and the like. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 4, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

With continued reference to FIG. 4, in some embodiments, a camera may include a plurality of cameras, wherein the plurality of cameras may capture two or more perspectives for use in three-dimensional (3D) reconstruction. The camera may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 4, in some embodiments, at least a sensor 420 may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some cases, at least a photodetector may be communicative with a computing device such as but not limited to at least a processor 108, such that the sensed signal such as but not limited to the photodetector data of the sensor data may be communicated with the at least a processor 108. In some embodiments, the electrical signal from the at least a photodetector may be stored in a storage 120. The storage 120 disclosed herein is further described below.

With continued reference to FIG. 4, in some cases, at least a photodetector may include a photodiode, a photoresistor, a photosensor, a photovoltaic chip, and the like. In some cases, the at least a photodetector may include a Germanium-based photodiode. The at least a photodetector may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. "Avalanche Photo Diodes (APDs)," as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When the reverse bias is less than the breakdown voltage, the gain of the APD may be approximately linear. For silicon APDs, this gain may be on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage may be referred to as a Single Photon Avalanche Diode, or SPAD. In this case, the n-p electric field may be sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode.

With continued reference to FIG. 4, in some embodiments, at least a photodetector may include a charge-coupled device (CCD), a complementary metal-oxide-semiconductor (CMOS) sensor, and the like. As a non-limiting example, the CCD sensor may include an array of tiny pixels that are sensitive to light. As another non-limiting example, the CMOS sensor may include an array of photodiodes. In both CCD and CMOS sensors, the electrical charge generated by the photodetector may be converted into a voltage signal, which may be then amplified and converted into a digital signal by a camera's analog-to-digital converter (ADC). The digital signal may be then processed by the camera's electronics to create an image.

With continued reference to FIG. 4, a pressure sensor may include a strain gauge, a piezoelectric pressure sensor (e.g. which may detect pressure by measuring an electric charge generated in a crystal such as quartz when pressure is applied to the crystal), a capacitive pressure sensor (e.g. which may detect a pressure by measuring a change in capacitance between two conductive plates when at least one of the plates is physically affected by the pressure), a resonant pressure sensor (e.g. which may detect a pressure by sensing a change in a resonant frequency of a vibrating structure when a pressure is applied to the resonant structure), an optical pressure sensor (which may detect pressure by detecting a change in transmission or reflection through an optical medium when a pressure is applied to the optical medium), and the like.

With continued reference to FIG. 4, a flow of matrix material may be controlled based on sensor data received from sensor 420. For example, a controller 424 may receive temperature and/or pressure data from one or more sensors 420. Prior to injecting matrix material into mold cavity 416, the sensor data may indicate a temperature and pressure associated with ambient temperature and pressure, such as approximately 70° F. and 1 atm. Controller 424 may initiate a flow of matrix material from the reservoir into the mold cavity 416 and receive sensor data while the matrix material is flowing into the mold cavity 416. Controller 424 may control one or more of matrix material pressure, matrix material flow rate, matrix material temperature, matrix material injection locations, and the like based on data received from sensors 420. For example, a mold may have four matrix material injection ports. Controller 424 may initially utilize one matrix material injection port to fill the mold cavity 416 with matrix material. Controller 424 may receive data from sensors 420 indicating that a portion of mold cavity 416 remains at ambient temperature and pressure a predetermined amount of time after beginning the injection of matrix material. Controller 424 may then alter or add flow from a matrix material injection location based on the data received from the sensors. For example, controller 424 may receive data from sensors 420 and be programmed by instructions contained on memory 724 to compare a pressure and temperature reading from sensors 420 to a predetermined threshold, such as 400° F. and 2 atm. If the data received from one or more sensors 420 indicates a temperature and/or pressure below 400° F. and 2 atm, controller 424 may begin a flow of matrix material from a second or subsequent matrix material injection port (for example, by opening or closing valve 428) until the data from all sensors indicates a temperature and/or pressure above 400° F. and 2 atm, indicating that all or substantially all of the volume within mold cavity 416 contains matrix material and/or reinforcing fibers.

With continued reference to FIG. 4, at least the mold insert 412 may comprise an elastomer. An "elastomer," as used herein, is defined as a polymer that exhibits elastic properties. Examples of elastic properties include deforming under an applied load and then rebounding to an original shape upon removal of the applied load. Mold insert 412 may include rubber, silicone, synthetic rubber, natural rubber, Styrene-butadiene rubber, isoprene rubber, polyurethane and the like. The elastomer may have a melting temperature higher than that of the matrix material being molded. In an embodiment, mold insert 412 and/or mold first part 404 may comprise a surface coating such as a demolding compound to prevent a molded part from sticking or adhering to mold first part 404 and/or mold insert 412. Examples of surface coatings or demolding compounds include polydimethylsiloxane (PDMS), waxes, fatty esters, silicones, metallic soap (e.g. lithium stearate, magnesium stearate, and the like), water-based die lubricants, etc. Additionally or alternatively, surfaces of mold 400 may be plasma treated or may have surface coatings deposited on the surface such as polytetrafluoroethylene (PTFE) deposited using chemical vapor deposition.

With continued reference to FIG. 4, the mold cavity may be in fluidic communication with a matrix material reservoir 428. "Fluidic communication," as used herein, is defined as having an unbroken path for fluid to travel from a first location to a second location. In an embodiment, a matrix material reservoir 428 may be located externally to mold first part 404 and/or mold second part 408. In an additional or alternative embodiment, matrix material reservoir may be disposed within one or more of mold first part 404, mold second part 408, and/or mold insert 412. Matrix material reservoir 428 may include valves, heating elements, sensors and the like. Matrix material reservoir 428 may be communicatively coupled with controller 424.

With continued reference to FIG. 4, a matrix material may include one or more of a thermoset, a thermoplastic, and a resin. A "thermoset," as used herein, is defined as a polymer which, once heated above its melting point and subsequently cooled below its melting point, can no longer be melted. Thermosets contain polymer chains which undergo irreversible cross-linking when heated above a certain temperature. This means that once a thermoset is cured, it cannot be melted and reshaped. A "thermoplastic," as used herein, is defined as a material containing polymer chains which can be repeatedly and melted and reshaped. A thermoplastic contains polymer chains which undergo reversible cross-linking when melted and subsequently cooled. Examples of thermosets include epoxies, phenolic resins, silicone rubber, polyester resins, and the like. Examples of thermoplastics include polyethylene, polypropylene, acrylonitrile butadiene styrene, polyvinyl chloride, polystyrene, fluoropolymers, thermoplastic elastomers, and the like. A "resin," as used herein, is defined as a curable material that can undergo polymerization. Examples of resins include thermosets, thermoplastics, esters, urethanes, and acrylics.

With continued reference to FIG. 4, mold insert 412 may contain one or more cavities defining an undercut. An "undercut," as used herein, is defined as a first portion of a part which is inset relative to a second portion of a part above the first portion when the part is in a particular orientation. Undercut cavity 436 may be included in mold insert 412 and be in fluidic communication with mold cavity 416. Undercut cavity 436 may define a volume such that when matrix material is flowed into mold cavity 416, the molded part is removably attached to the mold insert 412 by the portion of matrix material that flowed into undercut cavity 436. Undercut cavity 436 in an elastomer material may be deformable. Undercut cavity 436 may be designed and dimensioned to exert a specific amount of force on a molded part, for example between about 300 lbs and about 600 lbs. Undercut cavity 436 may be designed and dimensioned such that beyond a threshold amount of force, the elastomer deforms and releases the part. Undercut cavity 436 may be designed and dimensioned based on a maximum amount of stress or force a portion of the molded part within undercut cavity 436 can experience without fracturing, cracking, deforming, or otherwise failing. An undercut cavity 436 may form a groove, an overhang, or a similar shape.

With continued reference to FIG. 4, mold insert 412 may include at least one injection molding slide 440. An "injection molding slide," as used herein, is defined as a component movably disposed within a mold part and which is configured to movably cross a surface plane of a mold. An injection molding slide 440 may be used to eject or detach a molded part after a molding process has been completed. In an embodiment, mold insert 412 may include a plurality of injection molding slides. An injection molding slide 440 may include at least one surface that is flush with a molding surface of a mold part. Injection molding slide 440 may be toleranced so that one or more faces of injection molding slide 440 are within a threshold distance of an adjacent portion of mold insert 412. "Toleranced" is defined as designed such that a manufactured dimension of an element of a finished part varies less than a specified threshold. A "tolerance" is defined as a maximum allowable variation between a specified dimension and an actual measured dimension of a finished part. An injection molding slide 440 may, upon completion of a molding process, be used to demold a part from mold 400. "Demold" is defined as removing a molded part from a mold. For example, injection molding slide 440 may be extended from a position flush with mold insert 412 to a position extending beyond a mold insert 412 and may push a molded part away from the mold insert 412 and out of the mold 400.

With continued reference to FIG. 4, mold cavity 416 may define at least a former. "Former," as used herein, is defined as an object which provides structure and shape to a molded part. A former may have the shape or form of an aircraft component such as a pressure vessel, a passenger compartment, a cockpit, a wing, a control surface, a fuselage, a storage compartment, a electrical component compartment, a structural element, or any suitable portion of an aircraft. A former defined by mold cavity 416 may have the shape of a portion or substantially all of a component of an aircraft, for example a component of aircraft 300 in FIG. 3.

With continued reference to FIG. 4, mold cavity 416 may define at least a stringer. "Stringer," as used herein, is defined as a load-bearing component of an aircraft. A stringer may additionally or alternatively be referred to as a longeron. In an embodiment, a stringer may comprise a rib disposed substantially perpendicular to a pressure vessel of an aircraft. In an embodiment, a stringer may comprise a reinforcing fiber weave or mat. In an embodiment, the stringer may be attached to a fuselage reinforcing fiber mat by sewing or weaving the reinforcing fibers of the stringer into the reinforcing fibers of the fuselage. In an embodiment, a stringer may be attached to another component of an aircraft for molding using joining techniques described in FIG. 1. The stringer reinforcing fibers may be flexible and may, for example, deform under gravity relative to a design orientation if unsupported.

With continued reference to FIG. 4, one or both of the mold first part and the mold second part may include one or more stringer cavities 444, wherein at least one of the stringer cavities 444 define one or more arrangements of flexible stringer reinforcing fibers other than a natural orientation of unsupported stringer reinforcing fibers under the effect of gravity. For example, a stringer may have a shape of a rib oriented vertically upwards from a surface. Prior to molding and/or infusion with matrix material, the stringer reinforcing fibers may, under the effect of gravity, flex and/or deform such that the dimensions and/or orientation of stringer reinforcing fibers not containing matrix material and not being supported by additional structure differ from dimensions and/or orientations of molded stringer reinforcing fibers infused with matrix material by greater than a threshold amount. For example, given an identical set of stringer reinforcing fibers fixed to identical surfaces in identical manners (where one set of stringer reinforcing fibers contains no matrix material and is unsupported other than the fixed location and the other set of stringer reinforcing fibers has been infused with cured matrix material), unsupported and uninfused stringer reinforcing fibers may occupy a volume that differs from a volume occupied by a supported and or molded stringer due to the deflection of unsupported reinforcing fibers under the effect of gravity. Stringer cavities 444 may provide support for the one or more stringer reinforcing fibers prior to molding such that their supported and uninfused shape is substantially the same as their shape when infused with cured matrix material. This is further illustrated in FIG. 5. At least one sensor 420 may be disposed at least partially within at least one of the one or more stringer cavities 544.

Figure 5B:
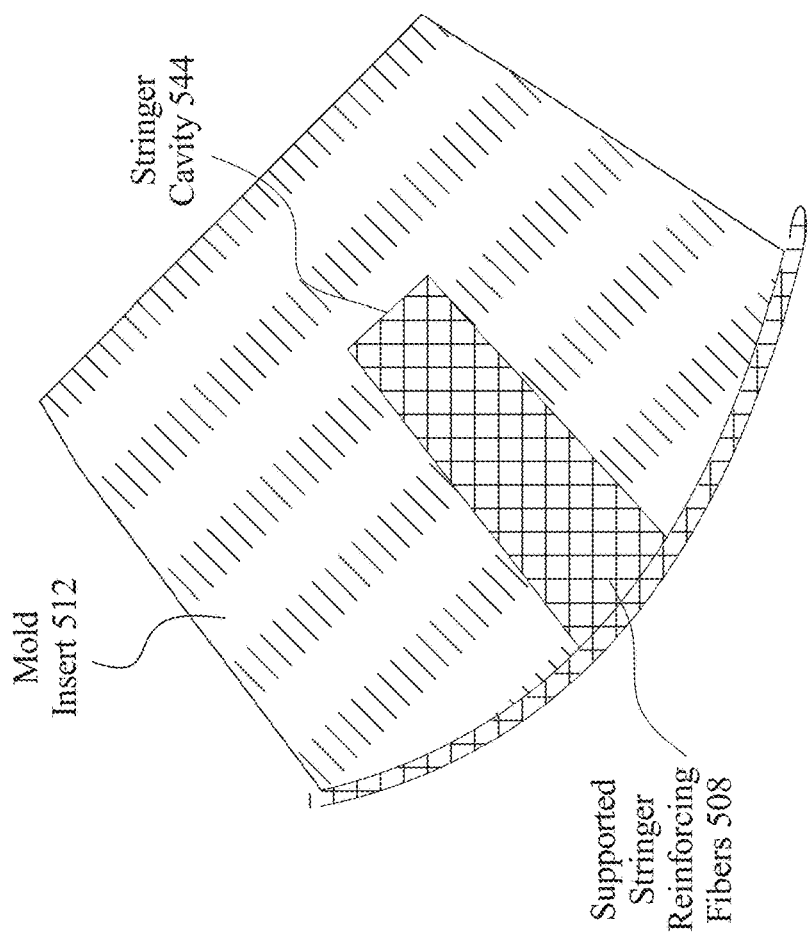
FIG. 5B is a representative illustration of an embodiment of supported stringer fibers in accordance with the disclosure.
Figure 5A:
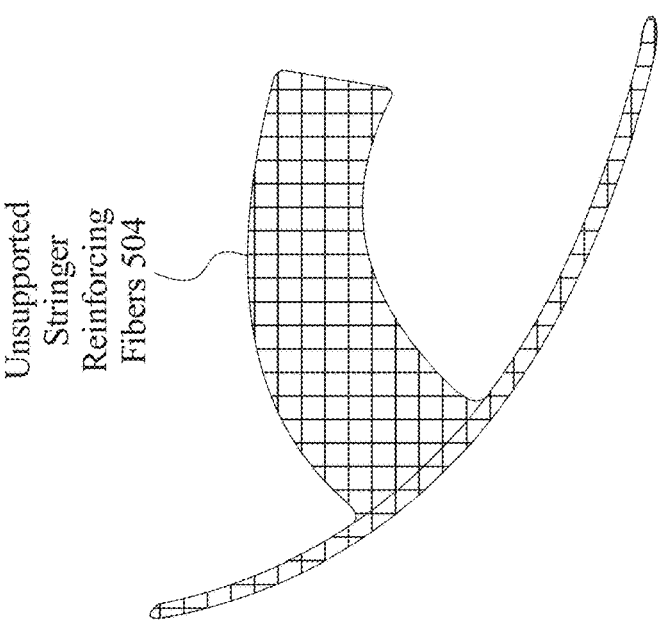
FIG. 5A is a representative illustration of an embodiment of unsupported stringer fibers in accordance with the disclosure.

Now referring to FIG. 5A and FIG. 5B, stringer cavity 544 and difference between unsupported stringer reinforcing fibers 504 in FIG. 5A and supported stringer reinforcing fibers 508 is illustrated. FIG. 5A shows unsupported stringer reinforcing fibers 504 have deformed from their intended orientation as illustrated by supported stringer reinforcing fibers 508. If unsupported stringer reinforcing fibers 504 were to be molded in the illustrated orientation, they would provide significantly reduced performance as compared to the intended orientation shown by supported stringer reinforcing fibers 508 in FIG. 5B. FIG. 5B shows mold insert 512 defining a stringer cavity. Additionally, mold insert 512 may be flexed or otherwise deformed to allow for supported stringer reinforcing fibers 508 to be removed from the mold without requiring excessive force.

Figure 6:
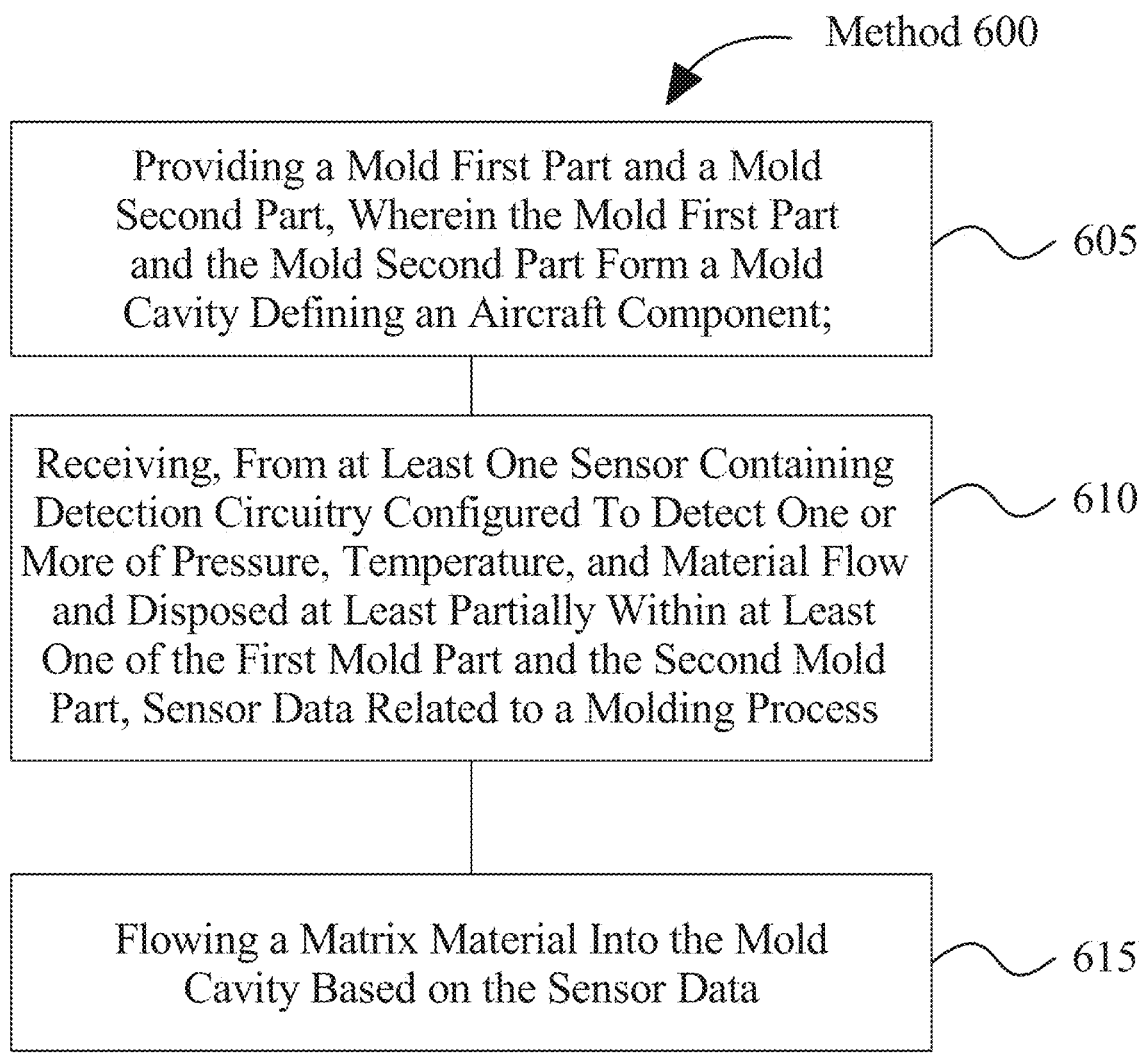
FIG. 6 is a diagrammatic representation of a method for molding in accordance with the disclosure.

Now referring to FIG. 6, a method 600 of molding a portion of an aircraft in a two-sided mold is described. Method 600 comprises the steps of 605 providing a mold first part and a mold second part, wherein the mold first part and the mold second part form a mold cavity defining an aircraft component; step 610 receiving, from at least one sensor containing detection circuitry configured to detect one or more of pressure, temperature, and material flow and disposed at least partially within at least one of the mold first part and the mold second part, sensor data related to a molding process; and step 615 flowing a matrix material into the mold cavity based on the sensor data.

Continuing to refer to FIG. 6, step 605 comprises the step of providing a mold first part and a mold second part, wherein the mold first part and the mold second part form a mold cavity defining an aircraft component. This step may be performed in accordance with mold 400 and recited uses with respect to FIG. 4.

Continuing to refer to FIG. 6, step 610 comprises the step of receiving, from at least one sensor containing detection circuitry configured to detect one or more of pressure, temperature, and material flow and disposed at least partially within at least one of the mold first part and the mold second part, sensor data related to a molding process. This step may be performed in accordance with mold 400 and recited uses with respect to FIG. 4.

Continuing to refer to FIG. 6, step 615 comprises the step of flowing a matrix material into the mold cavity based on the sensor data. This step may be performed in accordance with mold 400 and recited uses with respect to FIG. 4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module. As used herein, "module" may refer to a hardware module or a software module. A hardware module is any collection of hardware configured to perform at least a specified task. A software module, conversely, is any collection of software instructions configured to perform at least a specified task.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs, one or more hard disk drives in combination with a computer memory, a distributed storage system such as cloud storage, and the like. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
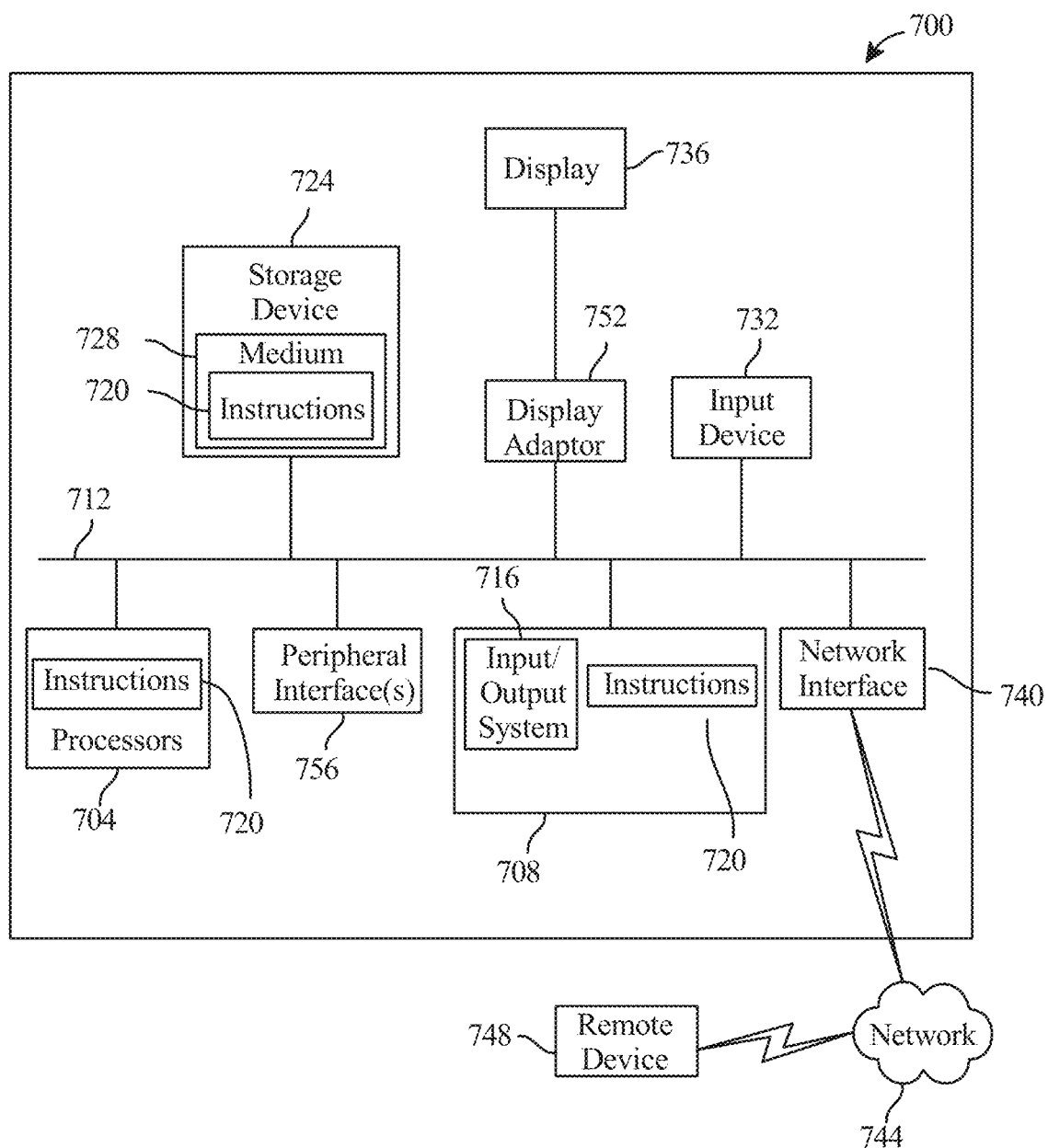
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

If not sufficiently clear from contextual or plain and ordinary usage, the terms "about," "around," "approximately," and "substantially," when used to modify a value, number, figure, quantity, or other term, can be understood to mean ±20% of the modified value, inclusive. For instance, if not sufficiently clear from contextual or plain and ordinary usage, "about 10" can be understood to mean "from 8 to 12 inclusive". If not sufficiently clear from contextual or plain and ordinary usage, the term "relatively" is used to indicate that one of ordinary skill in the art would more closely associate the described value or modifier with the term it modifies (such as high) than another term in a similar class of words (such as low or medium). For instance, if a temperature is described as being "relatively high," one of ordinary skill in the art would more closely associate said temperature with "high" temperatures than "medium" or "low" temperatures. In another example, if a tire pressure between 30-33 psi is considered "standard," then the term "relatively low pressure" would indicate that the stated pressure would be more readily identified by one of ordinary skill in the art as being "low" than being "standard;" for instance, 26 psi.

As used herein, "and/or" is meant to include all possible permutations of "and" and "or". "And/or" may indicate every element of a specified grouping, combinations of less than all elements, or one element. For example, A, B, and/or C can mean any single one of A, B, or C; A and B but not C, B and C but not A, A and C but not B; and A, B, and C together.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A mold for molding a portion of an aircraft, the mold comprising:
   a mold first part defining an outer mold line surface, a mold second part, and a mold insert, wherein the mold first part and the mold insert form a mold cavity defining an aircraft component, wherein the mold insert comprises:
      at least one injection molding slide movably disposed within the mold insert adjacent to the mold cavity and configured to movably extend into the mold cavity and at least one cavity defining an undercut and wherein the undercut forms an overhang; and
      an undercut cavity, wherein the undercut cavity is located between the mold first part and the mold second part, and wherein the undercut cavity is in fluidic communication with the mold cavity;
   at least one sensor disposed at least partially within at least one of the mold first part, the mold second part, and the mold insert, wherein the at least one sensor is configured to detect one or more molding parameters;
   a dry reinforcing fiber preform;
   at least one vacuum pump in fluidic communication with the mold cavity, wherein the vacuum pump pulls vacuum through the dry reinforcing fiber preform; and
   a controller configured to control a flow of matrix material as a function of the one or more molding parameters and the at least one vacuum pump.

2. The mold of claim 1, wherein at least the mold insert comprises an elastomer.

3. The mold of claim 2, wherein the elastomer comprises at least one of silicone, rubber, and polyurethane.

4. The mold of claim 1, wherein the mold cavity is in fluidic communication with a reservoir of the matrix material.

5. The mold of claim 4, wherein the matrix material comprises one or more of a thermoset, a thermoplastic, and a resin.

6. The mold of claim 1, wherein the mold cavity defines at least a stringer.

7. The mold of claim 6, wherein at least one of the mold first part and the mold insert comprises one or more stringer cavities, wherein at least one of the stringer cavities define one or more arrangements of flexible stringer reinforcing fibers other than a natural orientation of unsupported stringer reinforcing fibers under an effect of gravity.

8. The mold of claim 7, wherein the at least one sensor is disposed at least partially within at least one of the one or more stringer cavities.

* * * * *